(12) United States Patent
Stobart

(10) Patent No.: US 7,016,316 B2
(45) Date of Patent: Mar. 21, 2006

(54) SYNCHRONOUS TDD SYSTEM

(75) Inventor: Christopher Stobart, Nürnberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 747 days.

(21) Appl. No.: 09/739,511

(22) Filed: Dec. 18, 2000

(65) Prior Publication Data

US 2001/0017864 A1     Aug. 30, 2001

(30) Foreign Application Priority Data

Dec. 21, 1999    (DE) ................................ 199 61 674

(51) Int. Cl.
*H04L 5/14*    (2006.01)
(52) U.S. Cl. ........................ 370/278; 370/332
(58) Field of Classification Search ................ 370/231, 370/236, 278, 280, 294, 311, 329, 332
See application file for complete search history.

(56) References Cited

U.S. PATENT DOCUMENTS

| | | | | |
|---|---|---|---|---|
| 5,488,631 A | * | 1/1996 | Gold et al. | 375/145 |
| 5,515,366 A | * | 5/1996 | Chieu et al. | 370/347 |
| 5,903,618 A | * | 5/1999 | Miyake et al. | 375/356 |
| 5,956,326 A | * | 9/1999 | Magana | 370/277 |
| 5,995,500 A | * | 11/1999 | Ma et al. | 370/337 |
| 6,144,656 A | * | 11/2000 | Kinnunen et al. | 370/347 |

FOREIGN PATENT DOCUMENTS

| | | | |
|---|---|---|---|
| EP | 656735 A2 | * | 6/1995 |
| EP | 1227629 A1 | * | 7/2002 |

OTHER PUBLICATIONS

Zhou, S.H. et al. "Bypassing Vocoders in CDMA Mobile-to-Mobile Calls," IEEE Vehicular Technology Conference. May 18-21, 1998. vol. 3, pp. 2527-2531.*

* cited by examiner

*Primary Examiner*—John Pezzlo
*Assistant Examiner*—Donald L Mills
(74) *Attorney, Agent, or Firm*—Aaron Waxler

(57) ABSTRACT

The invention relates to a synchronous TDD system for the transmission of speech and/or data between a master unit (FP) and at least two slave units (PP1, PP2) which are associated with the master unit (FP), and also to a method to be carried out by such a system. In order to enable direct communication between the slave units (PP1, PP2) of the same system despite the regular transmission of synchronization signals to the slave units (PP1, PP2) by the master unit (FP), according to the invention the slave units (PP1, PP2) are rendered ready to receive in fixed time slots in a frequency channel which is not used by the master unit (FP) in these time slots. In these time slots the slave units (PP1, PP2) can receive signals from other slave units (PP1, PP2) of the system in order to initiate a communication between themselves.

14 Claims, 3 Drawing Sheets

SYNCHRONOUS TDD SYSTEM

The invention relates to a synchronous TDD (Time Division Duplex) system for the transmission of speech and/or data between a master unit and at least two slave units which are associated with the master unit. The invention also relates to a method for use in such a synchronous TDD system.

TDD systems for the transmission of speech and/or data are known from the practice of inter alia cordless telephone systems in which a handset, acting as a slave unit, can establish a connection with the fixed network via a base unit which acts as the master unit. A frequency channel used for transmissions in two directions in TDD systems is subdivided into time slots which are reserved alternately for transmissions in one of the two directions. Switching over can then take place either per time slot or also after each time a fixed number of time slots. Such a subdivision of the frequency channel used always enables only a single connection between a master unit and a slave unit.

Figure 3A:
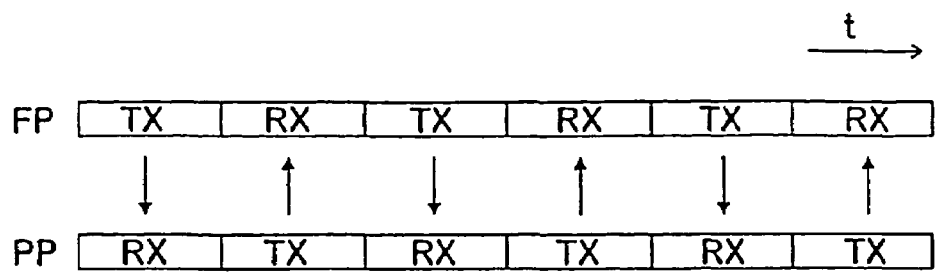

FIG. 3a illustrates the principle of a TDD method used for the communication between a base station and a handset. The upper part of the Figure shows the behavior of the base station FP as a function of time t while the lower part shows the behavior of the handset PP as a function of time t. Thus, the base station is set alternately for transmission TX or reception RX in conformity with the time slots, and the handset is set in exactly the opposite way for reception RX and transmission TX, respectively. Any transmissions take place in conformity with the behavior of the units as indicated by the arrows. Instead of a single frequency subdivided into time slots, a plurality of frequencies can also be used for the transmission when a Frequency Hopping Spread Spectrum (FHSS) or a Direct Sequence Spread Spectrum (DSSS) is applied.

The document WO 94/05101 describes a cordless telephone system which is based on TDD and includes at least one base station and a plurality of handsets, the base station communicating with the handsets by way of a communication protocol while utilizing given parameters. For communication between handsets associated with one base station it is proposed in the cited document that one of the handsets imitates the parameters of the communication protocol so as to enable another handset to be contacted.

However, the system disclosed in WO 94/05101 concerns an asynchronous TDD system, that is, neither the master unit nor the slave units transmit signals in the idle state. Asynchronous systems have the drawback that, because of the necessary regular scanning for transmitted signals in the standby mode, they have a high energy consumption. Moreover, a communication is established only comparatively slowly, because resynchronization is required between the relevant units before any connection is established.

These drawbacks are avoided by synchronous TDD systems in that the slave units are synchronized with the master unit. A synchronous TDD system is based, for example on the use of the 902–928 MHz ISM band which has been assigned to industrial, scientific and medical applications in the United States of America by the US Federal Communications Commission FCC and is defined in the FCC Regulation section 15.247. As is shown in FIG. 36 the master unit FP in synchronous systems regularly transmits synchronization signals (beacons) in the time slots intended for the transmission from the master unit FP to the slave units PP (upper part of the Figure). The transmission can also take place in frames which consist of each time two time slots. The slave units PP receive such synchronization signals or beacons (lower part of the Figure) and synchronize their clock accordingly. The requests for establishing a connection from the master unit to the relevant slave unit also take place in the same time slots. As a result, in the standby mode a low level of activity of the receivers of the slave unit is achieved so that energy consumption is reduced in comparison with an asynchronous system. Moreover, a connection can be established more quickly than in asynchronous systems, because the initial synchronization for each new connection to be established is dispensed with.

In order to minimize the energy consumption in synchronous systems, the slave units normally do not receive every synchronization signal transmitted by the master unit, but only as many signals as are required so as to maintain the synchronization and receive necessary messages from the base station. Moreover, it is possible for the master unit not to transmit in all time slots or frames so that system-internal interference is avoided. FIG. 3c shows, by way of example, a chart relating to such a transmission of synchronization signals.

Because all slave units are arranged for the reception of signals from the master unit in a synchronous TDD system, the slave units cannot communicate directly with one another. Communication between the slave units via the master unit, however, is not possible because only a single connection with the master unit is sustained.

Therefore, it is an object of the invention to provide a synchronous TDD system, including a master unit and at least two slave units associated with the master unit, as well as a method for such a system which enable direct communication between the slave units of the same system, despite a regular transmission of synchronization signals (beacons) from the master unit to the slave units.

The system and the method according to the invention create the possibility of communication between two slave units of a synchronous TDD system while maintaining the advantages of a synchronous system over an asynchronous system. Moreover, application in existing systems can take place without necessitating hardware modifications.

Preferred embodiments of the system according to the invention are disclosed in the dependent claims.

Figure 1A:
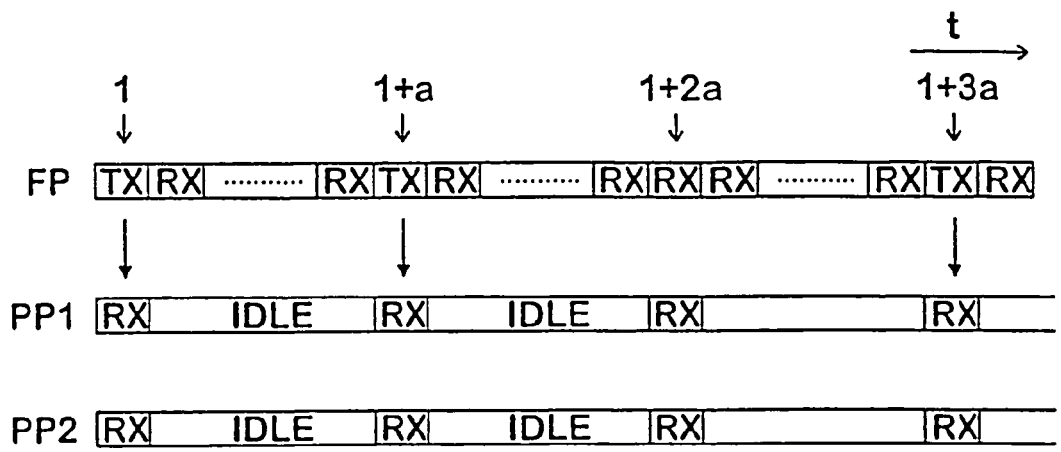
Figure 1B:
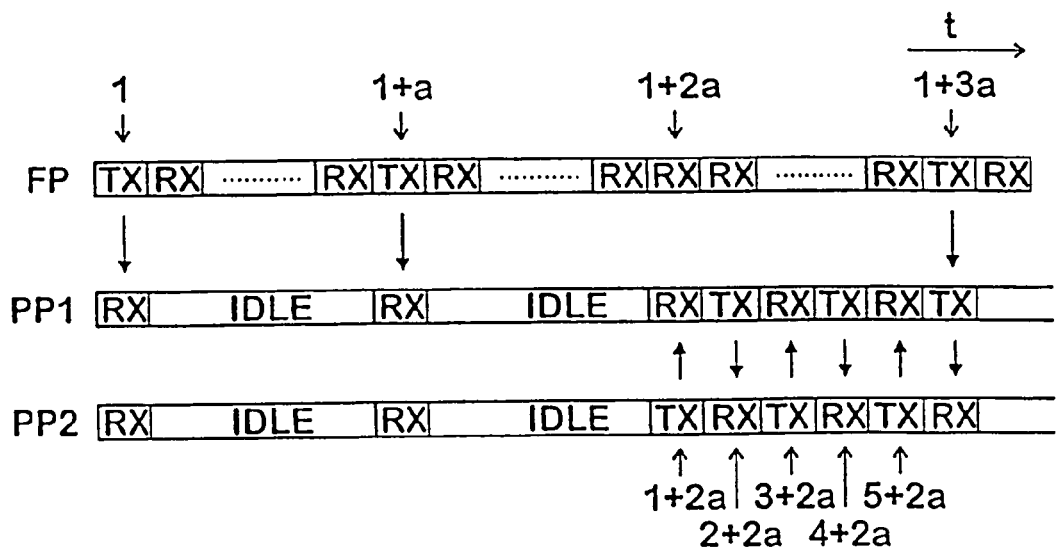
Figure 2:
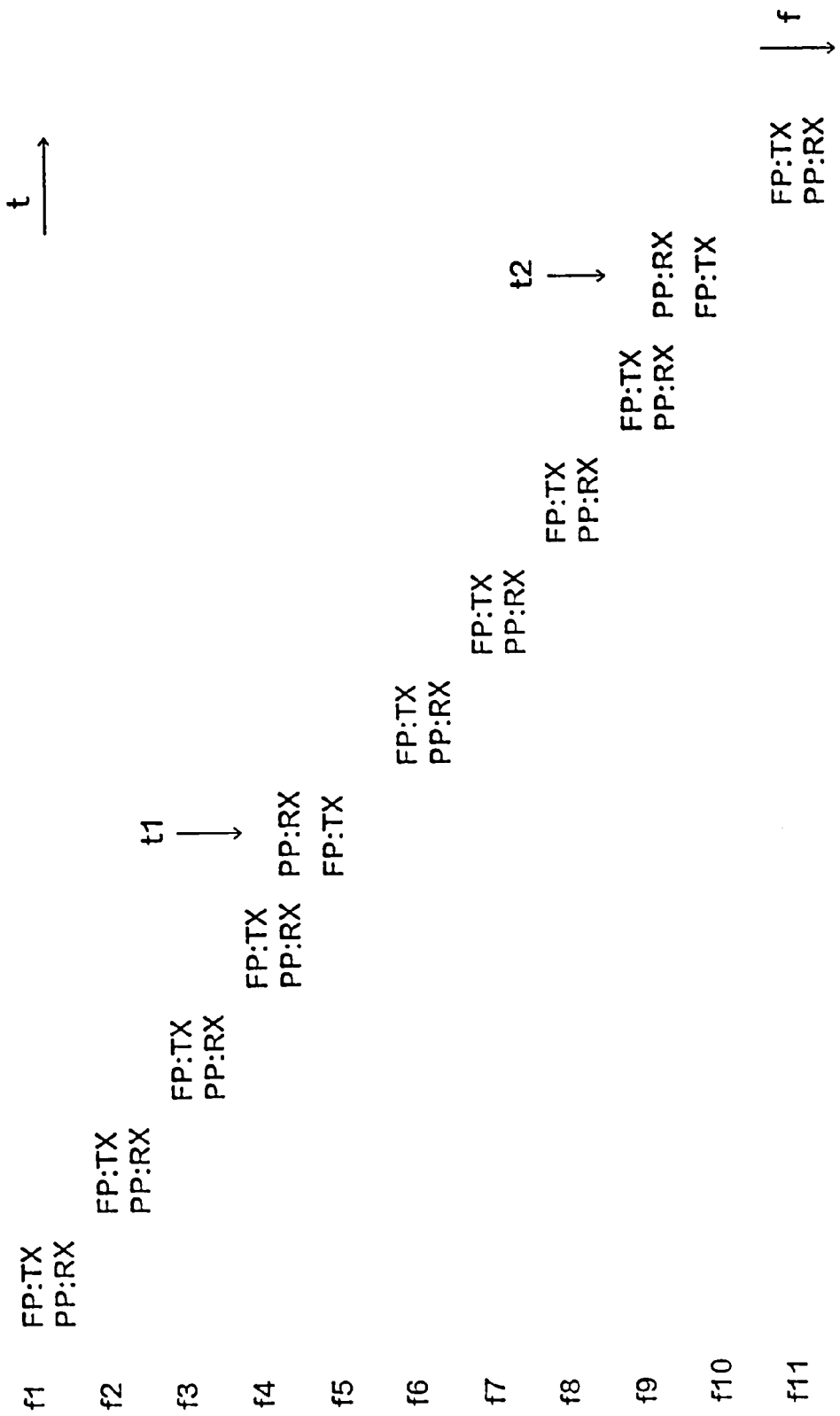
Figure 3B:
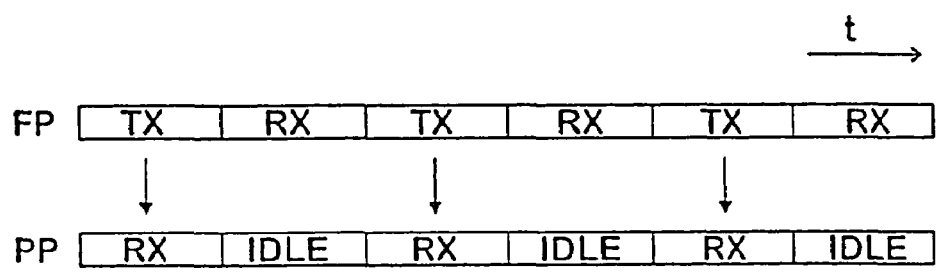
Figure 3C:
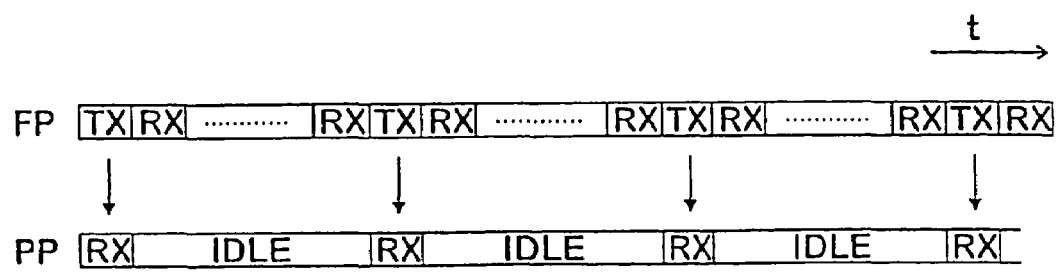

The invention will be described in detail hereinafter with reference to embodiments which are shown in the drawings; therein:

FIGS. 1a, 1b illustrate the principle of initiation of a transmission between two handsets in a first embodiment of a system according to the invention, FIG. 2 illustrates the principle of the initiation of a transmission in an embodiment for an FHSS system, FIG. 3a shows the transmission in time slots in a TDD system (state of the art), and FIGS. 3b, 3c show feasible transmissions of synchronization signals in a synchronous TDD system (state of the art).

The FIGS. 1a and 1b illustrate the principle of the synchronous TDD system and the method according to the invention. The system is formed, for example, by a cordless telephone system with synchronous TDD which comprises a base station FP as the master unit and at least two handsets PP1, PP2 as slave units. The handsets PP1, PP2 can communicate, via the base station as well as via the fixed network, with other stations, for example handsets associated with other base stations. The signal transmission itself can take place in various ways. For example, the transmissions can take place while utilizing a given frequency, but also while utilizing several frequencies, for example, by using a Frequency Hopping Spread Spectrum (FHSS) or a Direct Sequence Spread Spectrum (DSSS).

Like in the FIGS. 3a–3c already described as the state of the art, the upper part of the FIGS. 1a and 1b also shows the behavior of the base station FP as a function of time t. The central part and the lower part illustrate the behavior of two handsets PP1 and PP2 wherebetween communication is to be established. The transmission frequency is subdivided into time slots and is in principle assigned alternately to the transmission of signals from the base station FP to the handsets PP1, PP2 and to the transmission of signals from the handsets PP1, PP2 to the base station FP; this is realized in that the base station FP and the handsets PP1, PP2 are switched alternately and in a opposed manner to transmission TX and reception RX and to reception RX and transmission TX, respectively.

However, in the idle state the time slots are not continuously used for transmissions. For example, in the idle state the handsets PP1, PP2 are not switched to transmission at any time and the base station FP also transmits synchronization signals for the handsets PP1, PP2 only at regular intervals a in a time slot 1, 1+a, 1+2a, 1+3a, etc. provided for this purpose. In these time slots the handsets PP1, PP2 are ready for reception RX, but they are completely inactive (IDLE) therebetween in order to save energy.

After each time two transmissions of synchronization signals from the base station FP to the handsets PP1, PP2, in conformity with FIG. 1a the actually regular transmission of a synchronization signal does not take place in the time slot 1+2a, even though the handsets PP1, PP2 are still switched to the receiving mode in the corresponding time slot 2a+1. To this end, the transmission by the base station FP can be inhibited in the corresponding time slot 1+2a, for example in that the base station is switched simply to the receiving mode RX instead of the transmission mode TX. Alternatively, the handsets PP1, PP2 are switched to the receiving mode with a frequency which differs from the transmission frequency or a receiving code which deviates from the transmission code of a Frequency Hopping Spread Spectrum (FHSS) used for the transmission or a Direct Sequence Spread Spectrum (DSSS) when an FHSS or a DSSS method is used for the transmissions in the telephone system. Inhibiting the reception in the handsets PP1, PP2 instead of inhibiting the transmission in the base station FP in conformity with the alternative possibilities may be advantageous notably when the base station FP maintains an active connection with one of the handsets of the system at the relevant instant, because data in this connection could be lost if transmission were inhibited.

When a handset PP2 wishes to establish a connection to another handset PP1 of the system, it can insert its own transmission with the relevant frequency and/or DSSS code in the free time slot 1+2a in which the other handset PP1 is ready to receive but cannot receive a synchronization signal from the base station FP.

As is shown in FIG. 1b, the handset PP1 receives the transmission from the handset PP2; in response thereto a normal TDD connection can be established between the handsets PP1, PP2 in the time slots 1+2a, 2+2a, etc., the initiating handset PP2 then acting as a base station. If the connection between the base station FP and the handset PP1 were interrupted by inhibiting the transmission by the base station FP, a change of frequency or a change of the FHSS or DSSS code should take place as soon as the connection is established between the handsets PP1, PP2. Thus, interference with the "real" base station FP and other handsets in the system is avoided, because on the one hand the base station FP must still transmit synchronization signals for the other handsets and on the other hand other handsets might wish to establish connections between themselves.

Because one of the handsets PP2 acts as a base station for the connection between the handsets PP1, PP2 and the connection between the handsets PP1, PP2 and the "real" base station PP is interrupted, none of the two handsets PP1, PP2 involved will receive synchronization signals from the base station FP any longer. This means that the clock of the handsets PP1, PP2 will gradually start to deviate from the clock of the base station FP, so that resynchronization with the base station FP will be required after termination of the connection between the two handsets PP1, PP2. However, this resynchronization does not require more time and energy than required for the initialization phases in systems without regular synchronization signal. The effectiveness, therefore, is not inferior to that of asynchronous systems; it has also to be noted that in the system according to the invention resynchronization must always be performed only briefly after the enabling of a connection between two handsets as opposed to the situation in asynchronous TDD systems where resynchronization is required to the establish every regular connection between the base station and a handset.

If necessary, however the transmission of synchronization signals from the base station FP to the handsets PP1, PP2 can even be continued during a connection between two handsets PP1, PP2. To this end, on the one hand the data can be transmitted between the handsets PP1, PP2 at a data rate which is slightly higher than required, so that in each $n^{th}$ frame a time slot can be used for the transmission of the synchronization signal from the base station FP to the handsets PP1, PP2. On the other hand, the knowledge of the contents of the time slots (for example, VOX) received by the other handset can be used to determine whether they are necessary at all and, if not, to use the time slots only for resynchronization with the base station FP.

FIG. 2 illustrates the operation of an embodiment of a system according to the invention which is based on an FHSS system in the 902–928 MHz ISM band. Because of the FCC regulations for this band as well as because of the potential interference problems, for such a system a TDD system is preferably used instead of a TDMA system. The system considered herein should be a synchronous TDD system which utilizes synchronization signals for synchronizing the handsets PP with the base station FP.

The frequency hopping method normally involves 64 frequencies for the transmissions, the frequency being changed for each frame to be transmitted and hence for every second time slot. The handset PP is programmed in such a manner that it "wakes up" every 65 frames in order to receive a synchronization signal from the base station FP so as to adapt its clock to that of the base station FP. In each wake-up frame, the frequency used is thus incremented by one (65 modulo 64=1). The first 11 of the frequencies f1–f11 used are listed at the left-hand edge in FIG. 2. Towards the right the behavior of the base station FP and of a handset PP is shown for each frequency f as a function of time t. Therein, like in the other Figures, TX means that a unit is in the transmission mode, in this case shown exclusively for the base station FP, and RX means that a unit is ready to receive; this is shown exclusively for the handset PP.

In every fifth frame the transmission of the synchronization signal from the base station FP to the handset PP is inhibited because the handset PP continues to receive at the frequency f4 or f9 used for the preceding frames, but the base station FP already transmits at the next frequency f5 or f10.

Thus, while utilizing the preceding frequency the handset PP is capable of establishing a connection with another handset at given instants t1, t2. A condition to be satisfied for this procedure is that the handsets PP have a clock stability which suffices for the handset to run one period without receiving a new synchronization signal from the base station. Should this not be the case, it is also possible to insert an additional receiving frame for the handsets PP in a location between two necessary transmissions by the base station FP, because 64 non-required frames are present between each transmission of a synchronization signal. The communication between two handsets can then take place each time as from this additional receiving frame within the 64 frames that are not used.

What is claimed is:

1. A synchronous TDD system for the transmission of speech and/or data between a master unit (FP) and at least two slave units (PP1, PP2) which are associated with the master unit (FP), the master unit (FP) including transmission means for transmitting a synchronization signal (beacon) in fixed time slots and the slave units (PP1, PP2) including respective receiving means for receiving and processing the synchronization signals transmitted by the master unit, the receiving means of the slave units (PP1, PP2) allocating fixed time slots which are not used for a transmission of synchronization signals they are ready to receive or fixed time slots they are ready to receive with a setting which does not allow the reception of signals from the master unit (FP), the slave units (PP1, PP2) also including transmission means which use one of the time slots in which the receiving means of the slave units (PP1, PP2) are ready to receive, but reception of signals from the master unit (FP) is not enabled, in order to transmit signals for initiating a communication between themselves.

2. A synchronous TDD system as claimed in claim 1, wherein the transmission means transmits the synchronization signal at regular intervals (a) and regularly interrupt a regular transmission again, and the receiving means of the slave units (PP1, PP2) during this regular interruption are ready to receive a signal for initiating a communication with another slave unit (PP1, PP2) of the same master unit (FP).

3. A synchronous TDD system as claimed in claim 1, wherein the slave units (PP) are ready to receive at a frequency other than the frequency used by the master unit (FP) at fixed intervals during a time slot which is used for the transmission of synchronization signals by the master unit (FP).

4. A synchronous TDD system as claimed in claim 1, wherein the transmission means of the master unit (FP) utilize an FHSS (Frequency Hopping Spread Spectrum) code for the transmission of the synchronization and the receiving means of the slave units (PP) normally receive with the same FHSS code, but in fixed time slots with a different FHSS code which can be used to initiate a communication with another slave unit (PP).

5. A synchronous TDD system as claimed in claim 1, wherein the transmission means of the master unit (FP) utilize a DSSS (Direct Sequence Spread Spectrum) code for the transmission of the synchronization signals and the receiving means of the slave units (PP) normally receive with the same DSSS code, but in fixed time slots with a different DSSS code which can be used to initiate a communication with another slave unit (PP).

6. A synchronous TDD system as claimed in claim 1, wherein the transmission and receiving means of the slave units (PP1, PP2) establish, after the initiation of the communication, between themselves a normal TDD connection with a frequency or with a code of an FHSS or a DSSS other than the frequency or code used by the master unit (FP) for the transmission of the synchronization signal.

7. A synchronous TDD system as claimed in claim 1, wherein the receiving means of the slave units (PP1, PP2) continue the reception of synchronization signals from the master unit (FP) during a communication between two slave units (PP1, PP2) in time slots which are not required for this communication.

8. A synchronous TDD system as claimed in claim 1, wherein the system is a cordless communication system, notably a 902–928 MHz ISM band system, and that the master unit (FP) is a base station and the slave units (PP1, PP2) are handsets.

9. A method for a synchronous TDD system for the transmission of speech and/or data between a master unit (FP) and at least two slave units (PP1, PP2) which are associated with the master unit (FP), which method includes the following steps:
   a) transmission of a synchronization signal (beacon) by the master unit (FP) in fixed time slots (1, 1+a), which synchronization signal is received by the slave units (PP1, PP2),
   b) switching the slave units (PP1, PP2) so as to be ready to receive in fixed time slots (1+2a) in such a manner that it is impossible to receive signals from the master unit;
   c) enabling the slave units (PP1, PP2) to transmit a signal during such a time slot (1+2a) in conformity with step b), which signal can be received by the other slave units (PP1, PP2) during the relevant time slot (1+2a);
   d) enabling the slave units (PP1, PP2) to establish direct communication between themselves upon reception of a signal transmitted by a first slave unit (PP1, PP2) in conformity with step c) by a second slave unit (PP1, PP2) during a time slot (1+2a) in conformity with step b).

10. A method as recited in claim 9, wherein the master unit utilizes a Frequency Hopping Spread Spectrum (FHSS) code for the transmission of the synchronization signal and the slave units normally receive with the same FHSS code, but in fixed time slots with a different FHSS code which can be used to initiate a communication with another slave unit.

11. A method as recited in claim 9, wherein the master unit utilizes a Direct Sequence Spread Spectrum (DSSS) code for the transmission of the synchronization signal and the slave units normally receive with the same DSSS code, but in fixed time slots with a different DSSS code which can be used to initiate a communication with another slave unit.

12. A method as recited in claim 9, wherein the slave units establish, after the initiation of the communication, between themselves a normal TDD connection with a frequency or with a code of an FHSS or a DSSS other than the frequency or code used by the master unit for the transmission of the synchronization signal.

13. A method as recited in claim 9, wherein the slave units continue the reception of the synchronization signal from the master unit during a communication between two slave units in time slots which are not required for this communication.

14. A synchronous TDD system as claimed in claim 9, wherein the system is a cordless communication system, and the master unit is a base station and the slave units are handsets.

* * * * *